United States Patent [19]

Pysh

[11] Patent Number: 4,896,695
[45] Date of Patent: Jan. 30, 1990

[54] CHECK VALVE

[76] Inventor: Wasyl A. Pysh, 620 W. Sixth St., Erie, Pa. 16507

[21] Appl. No.: 331,224

[22] Filed: May 1, 1989

Related U.S. Application Data

[63] Continuation of Ser. No. 243,507, Sept. 12, 1988 abandoned.

[51] Int. Cl.⁴ ............................................. F16K 15/03
[52] U.S. Cl. ........................... 137/512.1; 137/515.7; 137/527
[58] Field of Search ............... 137/512.1, 515.7, 527, 137/527.4

[56] References Cited

U.S. PATENT DOCUMENTS

| | | | |
|---|---|---|---|
| 3,023,771 | 3/1962 | Hinds | 137/512.1 X |
| 3,678,958 | 7/1972 | Satterwhite et al. | 137/512.1 |
| 4,043,358 | 8/1977 | Sliski | 137/512.1 |
| 4,230,148 | 10/1980 | Ogle, Jr. | 137/512.1 |
| 4,249,567 | 2/1981 | Weiss | 137/512.1 X |
| 4,257,444 | 3/1981 | Ogle, Jr. et al. | 137/512.1 X |
| 4,602,654 | 7/1986 | Stehling et al. | 137/512.1 X |

*Primary Examiner*—John Rivell
*Attorney, Agent, or Firm*—Charles L. Lovercheck; Wayne L. Lovercheck; Dale R. Lovercheck

[57] ABSTRACT

A check valve having a hollow cylindrical body with a ledge extending around its inner periphery between its ends. A bar extends across the hollow body and is attached at its ends to the ledge. A sealing surface is formed on the ledge and on the bar, both in the same plane. Spaced flat bottom lugs rest on the seating surface and have bores that receive the ends of an axle. Plate-like valve members are hinged to the axle and a spring on the axle urges the valve members to a closed position to seal on the seating surface.

1 Claim, 2 Drawing Sheets

CHECK VALVE

This is a streamlined continuation of application Ser. No. 243,507, filed Sept. 12, 1988 now abandoned.

BACKGROUND OF THE INVENTION

Check valves of the general type disclosed herein have been previously provided with a hinge pin, which estends through the valve body to support the valve flaps that extend through holes formed in each side of the valve body. These holes must be sealed in order to make the valve body fluid tight and must be removable to that the valve member may be removed. The valve disclosed herein has an axle supportedon lugs inside the body so that the axle does not penetrate the valve body and therefore no holes are necessary through the valve body.

REFERENCE TO PRIOR ART

Valves of the general type disclosed herein are shown in the following patents:
U.S. Pat. No. 2,898,080 to Smith,
U.S. Pat. No. 3,047,012 to Smith,
U.S. Pat. No. 3,166,093 to Hopper,
U.S. Pat. No. 3,208,472 to Scaramucci,
U.S. Pat. No. 3,295,547 to Scarmucci,
U.S. Pat. No. 4,617,958 to Seidel et al.

STATEMENT OF INVENTION

The present invention provides a check valve body with a valve member supported by a hinge pin that requires no holes in the sides of the valve body to receive the hinge pin, but instead, provides spaced, bored lugs fixed to a ledge around the inside of the valve body. The ends of the valve members have hinges swingably supporting the valve members to an axle.

OBJECTS OF THE INVENTION

It is an object of the invention to provide an improved check valve.

Another object of the invention is to provide a check valve having a valve body with no openings through the body itself.

Another object of the invention is to provide a check valve that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit of sacrificing any of the advantages of the invention.

DETAILED DESCRIPTION OF THE DRAWING

Figure 1:
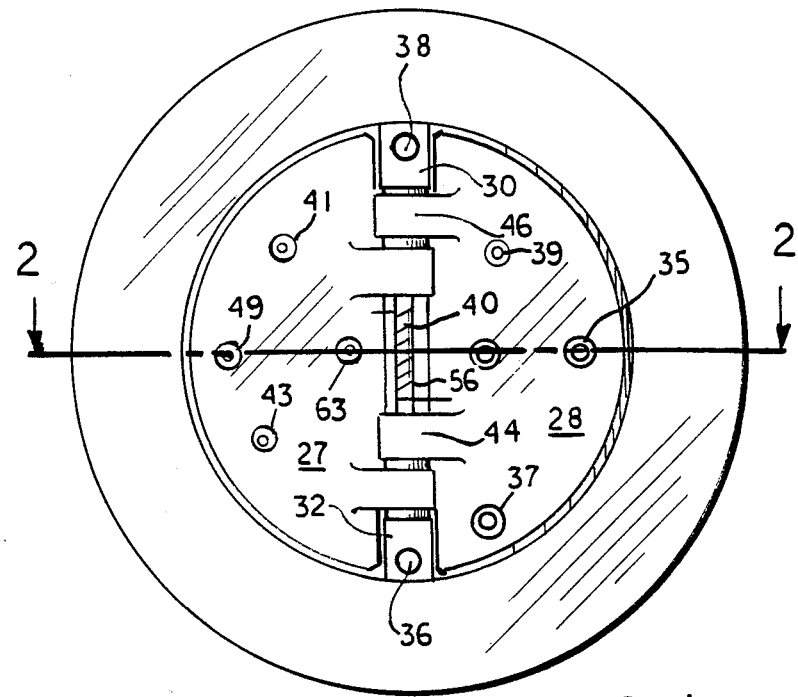
FIG. 1 is an end view of the check valve according to the invention.
Figure 2:
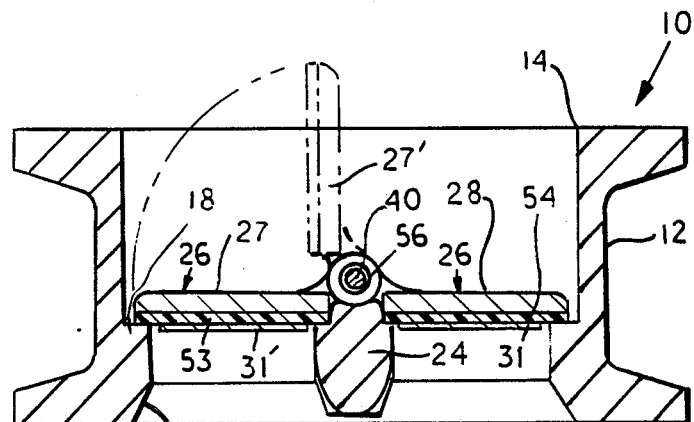
FIG. 2 is a longitudinal cross sectional view taken on line 2—2 of FIG. 1.
Figure 3:
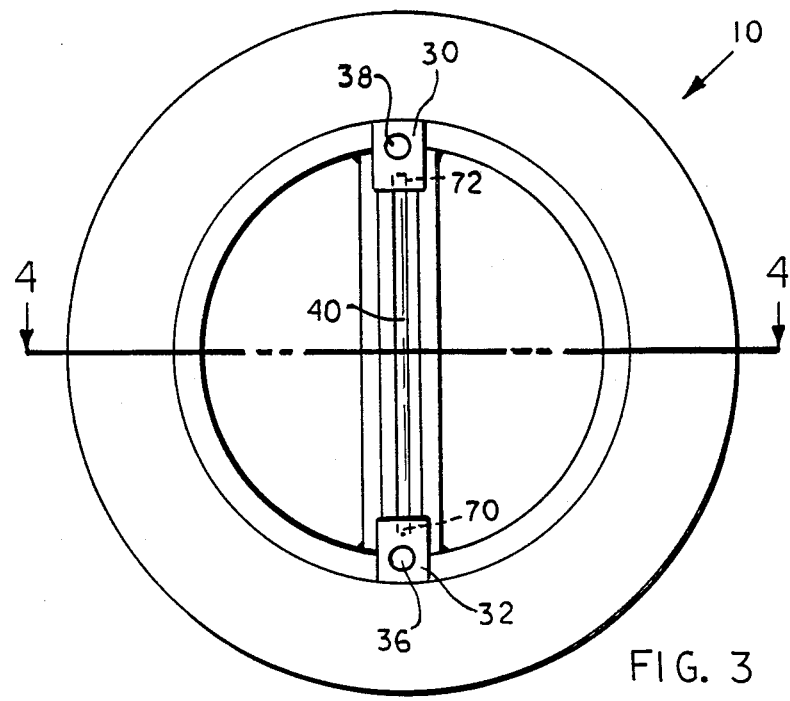
FIG. 3 is an end view of the valve shown in FIG. 1 with the valve members removed.
Figure 4:
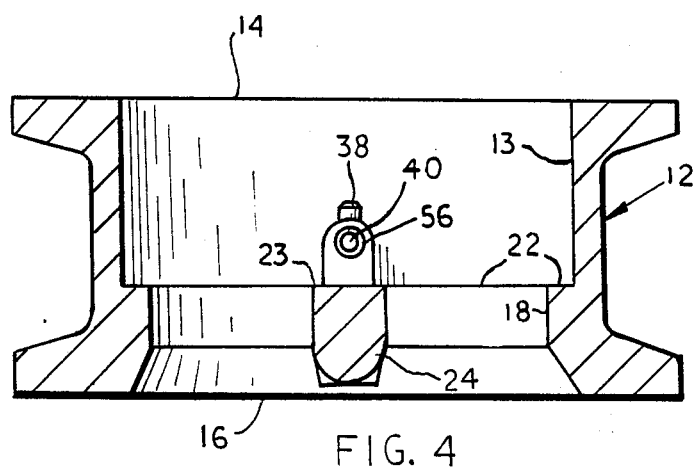
FIG. 4 is a longitudinal cross sectional view taken on line 4—4 of FIG. 3.

Now with more particular reference to the drawings, check valve 10 has a hollow body 12 having an inner periphery 13 defining a flow passage therethrough. Hollow body 12 has inlet end 16, outlet end 14 and support ring or ledge 18, which may be integral with body 12 and extending around inner periphery 13. Support bar 24 extends diametrically from one side of the flow passage through hollow body 12 to the other side. First valve seat 22 is disposed on top of ledge 18 in the same plane with second valve seat 23 on support bar 24.

Two spaced lugs 30 and 32 are disposed, one at each side of the flow passage. Lugs 30 and 32 have flat bottom surfaces that rest on first valve seat 22. Lugs 30 and 32 have bores 70 and 72 respectively and receive the ends of axle 40 which extends through each bore in lugs 30 and 32. Lugs 30 and 32 are held in place on first valve seat 22 by set screws 36 and 38.

Two valve members 26 include two semi-circular valve plates 27 and 28, which are swingably connected to axle 40 by hinge members 44 and 46. One valve member 26 is made up of a resilient sealing member 54 sandwiched between valve plate 28 and rigid plate like member 31. The other valve member 26 is made up of a resilient sealing member 53 sandwiched between valve plate 27 and rigid plate like member 31'. Resilient sealing members 53 and 54 may be made of rubber sheet or other suitable flexible sheet material. Screws 35, 37, 39, 41, 43, 49, and 63 hold valve plates 27 and 28 to rigid plate like members 31 and 31'. When valve members 26 are swung from the phantom line position 27' to the full line position, the perpherial edges of resilient sealing members 53 and 54 rest on first valve seat 22 of ledge 18 and on second valve seat 23 of bar 24.

Valve plates 27 and 28 are larger in area than rigid plate like members 31 and 31'. Rigid plate like members 31 and 31' are smaller in area than resilient sealing members 53 and 54. Therefore, the marginal edges of resilient sealing memebers 53 and 54 extend outward from plate like members 31 and 31' and rest on first valve seat 22 and second valve seat 23. The force of fluid from outlet end 14 presses resilient sealing members 53 and 54 into firm sealing relation with first valve seat 22 and second valve seat 23. The outer edge of valve plates 27 and 28 overlie first valve seat 22 and second valve seat 23 insuring a positive seal.

Helical spring 56 is supported on axle 40. Spring 56 has ends engaging valve members 26, urging valve members 26 to closed positions. Spring 56 has a first end which overlies valve plate adjacent hinge member 44 and a second end that overlies valve plate 28 urging the valve members 26 to swing to closed positions.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A check valve comprising a hollow body, said hollow body having an inner periphery defining a flow passage therethrough,
   said body having an inlet end, an outlet end and an intermediate part, a ledge integrally attached to the inner periphery of said intermediate part, said ledge having a first valve seat formed on it, a laterally extending bar having ends extending across said flow passage and said ends of said bar being integrally attached to said ledge at its said ends, a second valve seat formed on said bar, said second valve seat being disposed substantially in a common plane with first valve seat, valve members, said valve members comprising valve plates sealing means on said valve plates engaging said first valve seat and said second valve seat when said valve members are in closed position, providing a seal, said valve members being adapted move to a position away from said first valve seat and said second valve seat when said valve members are in an open position, a first lug and a second lug, each said lug having a flat bottom surface resting on said first valve seat, a first set screw extending through said first lug and threadably engaging said ledge, rigidly clamping said first lug to said first valve seat, a second set screw extending through said second lug, rigidly clamping said second lug to said valve seat, an axle, said axle having a first end and a second end, a first laterally extending hole in said first lug receiving said first end of said axle, a second laterally extending hole in said second lug receiving said second end of said axle, said first end and said second end of said axle terminating inside said hollow body, each said valve member comprising a semi-circular valve plate, said first set screw and said second set screw being adapted to be removed from said ledge whereby said lugs, said axle and said valve members can be removed from said flow passage.

* * * * *